United States Patent Office.

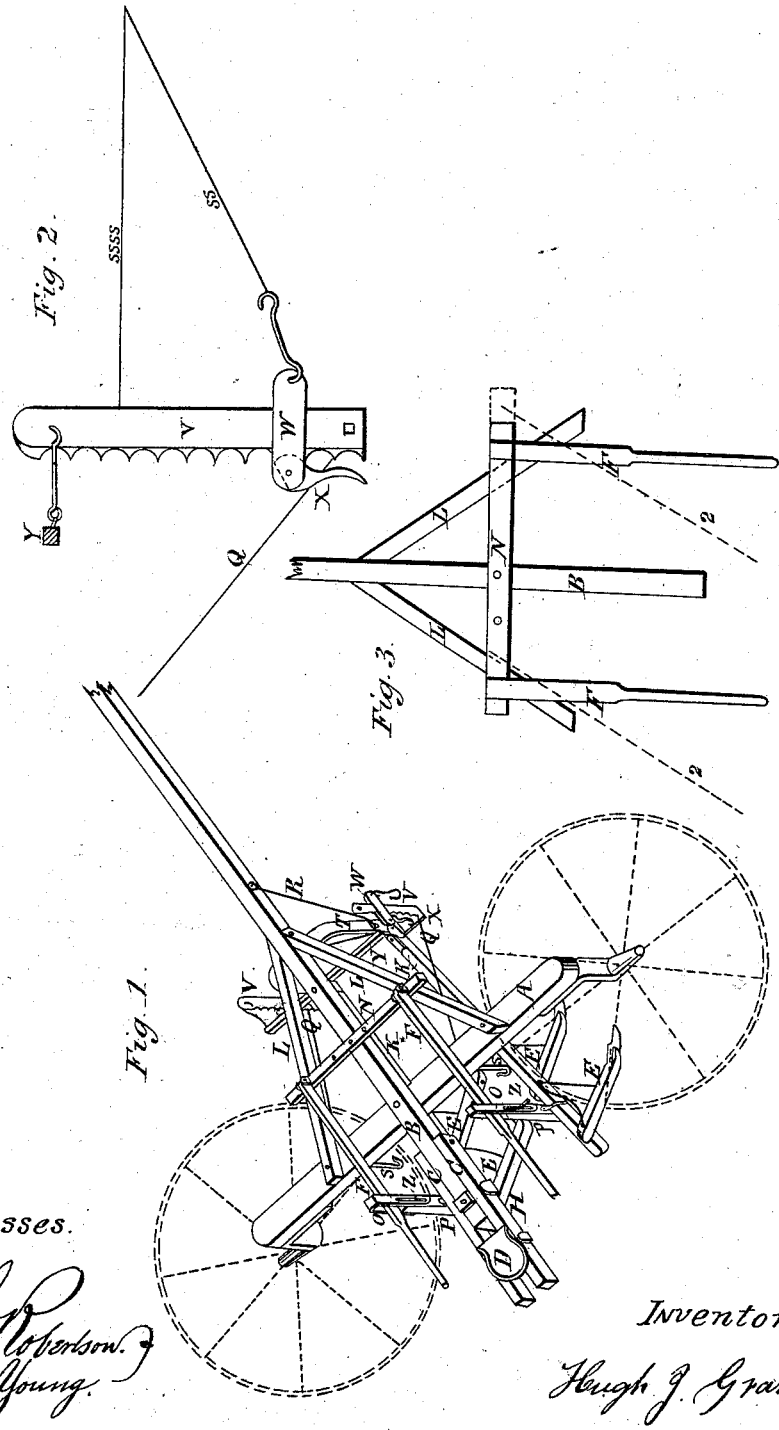

HUGH J. GRAHAM, OF MONMOUTH, ILLINOIS.

Letters Patent No. 70,430, dated November 5, 1867.

IMPROVEMENT IN CULTIVATORS.

*The Schedule referred to in these Letters Patent and making part of the same.*

TO ALL WHOM IT MAY CONCERN:

Be it known that I, HUGH J. GRAHAM, of the city of Monmouth, county of Warren, and State of Illinois, have made certain Improvements in Two-Wheeled Cultivators for cultivating plants in rows; and I hereby declare the following to be a full, clear, and exact description of the construction and operation of the same, reference being had to the annexed drawings, making a part of this specification, in which—

Figure 1 is a perspective view of the whole.

Figure 2 is a section of draught-equalizer and balancing-device, and

Figure 3 a top plan of part of the frame.

To enable others to make and use my machine, I proceed to the following description:

I first construct my frame by placing the tongue B at right angles on the axle, and bracing it in position by the braces L L, fig. 1. Beneath the tongue, and in front of double-tree, I place the curved iron T, provided with holes near the lower end for attaching the plough-beams K K at different heights, and to which I pivot the bar V, fig. 2, with notches for holding the sliding clutch W at different heights by means of the pawl X. From the lower end of bar V I carry the brace Q to the axle. I then place the cross-piece N, fig. 1, transversely forward of the axle, to which piece N I hinge the handles F F, fig. 2. These handles I connect by means of the uprights P P, fig. 1, to the plough-beams, and at the top of the uprights P P I provide means, by the slotted bars O O and a thumb-screw, Z, of regulating the height of the handles for different drivers, and for a riding or a walking-plough. At the sides and back end of the tongue I hinge the seat pieces C C, which, when turned down and parallel with the tongue, form a riding-plough, with the seat D.

By turning these seat-pieces over on the axle, it becomes a walking-plough. When used as a riding-plough I keep the sliding bar N pinned to the tongue through the centre hole; but when changed to a walking-plough I slide the bar N to one side a few inches, and pin by another hole, thus throwing the handles F F to one side, as seen at the dotted lines 2 2, and enabling the ploughman to walk between the rows. To balance the frame, when changed from riding to walking, and *vice versa*, I use the sliding-clutch W and sliding seat-board D. It will be seen at fig. 2 that when the clutch is down low, and the draught on the line S S, it will tend to throw the tongue up or support the weight in front. And when the clutch is moved up, and the draught on the line S S S S, it will allow the weight in front to drop in order to balance a driver's weight. I provide the hooks S S under the axle to swing the ploughs by means of the braces, when not in use, or in turning.

What I claim as my invention, and desire to secure by Letters Patent, is—

1. I claim the slotted bar O, in combination with the handles F F and upright bars P P, substantially as described and for the purpose set forth.

2. The curved iron T, in combination with the notched bar V, clutch W, brace Q, and sliding seat D, arranged as set forth and for the purpose claimed.

3. The movable bar N, in combination with the handles, for the purpose described, and substantially as arranged.

4. The clutch or slide W and notched bar V, substantially as described and combined, for the purpose set forth.

5. The hinge C, in combination with the curve T, for the purpose of giving vertical and lateral movement, and for vertical adjustment.

HUGH J. GRAHAM.

Witnesses:
W. B. RICHARDS,
GEO. D. WOODS.